Figure 1:
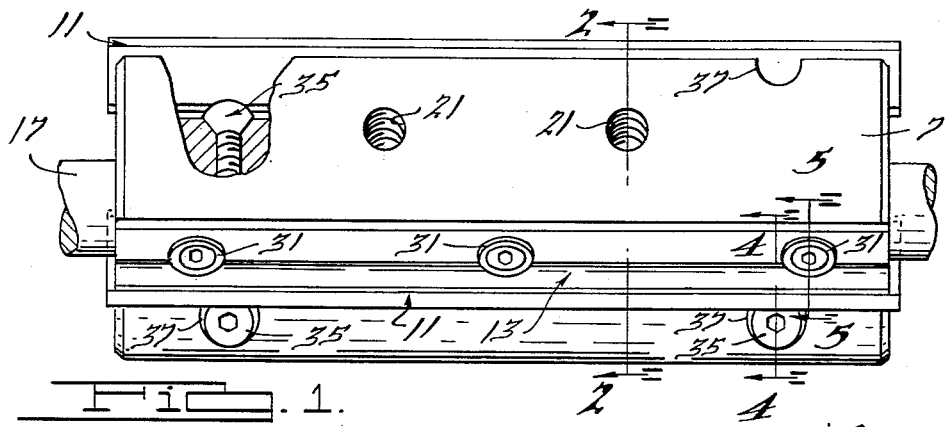

May 27, 1958 W. L. GASKELL 2,836,206
BIT ANCHORAGE MEANS FOR A CYLINDRICAL CUTTER HEAD
Filed Aug. 15, 1956

INVENTOR.
Walter L. Gaskell
BY
Harness, Dickey & Pierce
ATTORNEYS

United States Patent Office 2,836,206
Patented May 27, 1958

2,836,206

BIT ANCHORAGE MEANS FOR A CYLINDRICAL CUTTER HEAD

Walter L. Gaskell, Ypsilanti, Mich., assignor to King-Seeley Corporation, Ypsilanti, Mich., a corporation Application August 15, 1956, Serial No. 604,112

9 Claims. (Cl. 144—230)

This invention relates to rotary cutter heads for woodworking machines particularly for jointer-planer type woodworking machines.

Important objects of the invention are to provide a rotary cutter head having improved means exerting an inward wedging action for securely locking the cutter blades thereon; to provide such means in the form of inwardly converging cutter blade slots and clamping bars whereby the action of the blades against the work augments their retention; to provide the clamping bars with a construction in relation to said slot whereby the clamping bars are movable outwardly of the slots without restriction to facilitate positioning of the cutter blades; and to provide in combination with the foregoing structure, means for adjustably fastening the clamping bars to the body portion of the cuter head and outwardly acting blade positioning means also adjustably fastened to said body portion and arranged to release the blades from their wedged position.

The above and related objects will become apparent during the course of the following description, taken in conjunction with the accompanying drawing.

Figure 3:
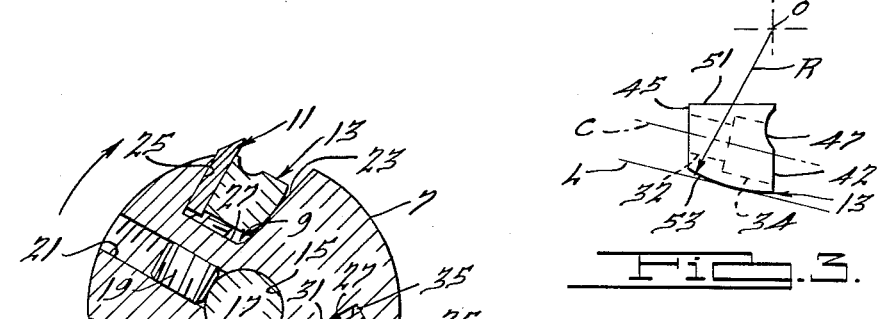
Figure 2:
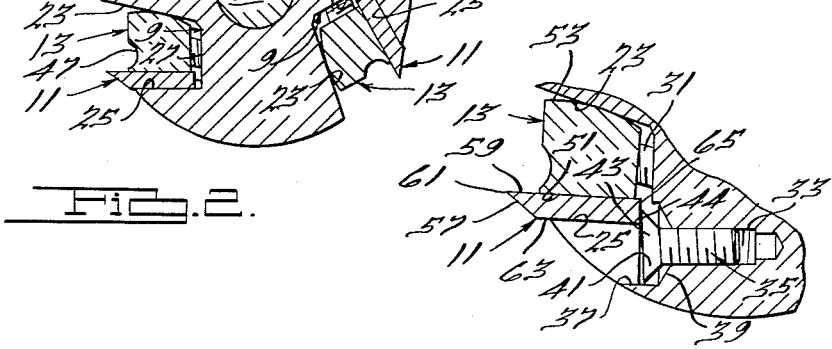
Figure 4:
Figure 5:
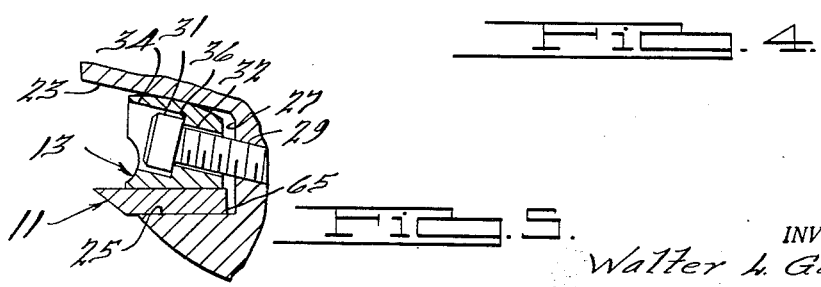

In the drawing:

Figure 1 is an elevational view partly in section of a rotary cutter head embodying the invention; and Figure 2 is a vertical section on the line 2—2 of Figure 1; and Figure 3 is a side elevation of a wedge block showing the construction of the same in greater detail; and Figures 4 and 5 are vertical sections on the lines 4—4 and 5—5 respectively, of Figure 1.

In accordance with the invention the rotary cutter head comprises a cylindrical body portion 7 provided in the embodiment shown with three longitudinally extending slots 9 formed inwardly from the peripheral surfaces thereof and circumferentially spaced equally thereabouts. A cutter blade 11 is retained within each of the slots 9 by a clamping bar 13 through cooperative action with the side walls of the slots 9 in a manner to be described. Conventionally a central bore 15 is formed in the body portion 7 for receiving a shaft 17 adapted to be journaled by means (not shown) in a woodworking machine, especially a jointer-planer. For affixing the cutter head to the shaft 17 set screws 19 bear against the latter and are threadably received in radial apertures 21.

Each of the slots 9 extends over the length of the body portion 7 and converges inwardly thereof due to the configuration of its side walls, the leading side wall and the trailing side wall with respect to the direction of rotation (shown by the arrow in Figure 2) being indicated at 23 and 25, respectively. The leading side wall 23 makes an obtuse angle while the trailing side wall 25 makes a right angle with the bottom surface 27 of each slot. Disposed substantially centrally widthwise of the bottom surface 27 of each slot are a suitable number of tapped apertures 29 spaced equally over the length of the cutter head on each side of the center thereof, each of which projects into the body portion 7 substantially parallel to the leading side wall 23. The tapped apertures 29 in each slot threadably engage socket head cap screws 31 each of which extends through the clamping bar 13 by virtue of untapped counterbores 32, 34 therein which form an annular shoulder 36 to engage the head of the cap screw 31 for adjustably fastening the clamping bar 13 to the body portion 7. Disposed adjacent the trailing side wall 25 of each slot and spaced equally about the center thereof are a pair of tapped apertures 33 which threadably receive micro adjusting screws 35 for breaking the lock on and to provide micro adjustment of the height of the cutter blades 11 relative to the peripheral surfaces of the body portion 7. Each of the adjusting screws 35 has a flat head provided with a wrench socket. Above each of the apertures 33 an enlarged bore 37 protrudes into the body portion 7 from the peripheral surfaces thereof and terminates in a chamfer 39 which is aligned with each of the apertures 33. A major portion as at 41 (Fig. 4) of the upper surface of the flat head on each of the screws 35 operates within each enlarged bore 37 and, due to the fact that the aperture 33 is at a slight angle to face 25, the outer edge 43 of the screw head projects into each slot and engages a central section of the bottom of each cutter blade 11 as seen at 44. Thus each cutter blade is positioned by a pair of the screws 35 which also serve to release each blade from the position in which it is wedged by the clamping bar 13, as will be described, and for these purposes the socket on the head of each of the screws 35 is accessible from the exterior of the cutter head for engagement with a suitable wrench. Since the edge 43 engages a central portion of the blade bottom, the sharp corner edge of the blade will not act to shave the screw head.

Fig. 3 shows in greater detail the structure of one of the clamping bars 13, the side faces of which generally converge inwardly from near the top face 42 to the bottom face 45 so as to cooperate with the inwardly converging slots 9. Each of the top and bottom faces 42, 45 is flat and in the top face 45 is formed a chip break groove 47 which extends longitudinally over the length of the clamping bar 13. The chip break groove 47 is narrow in width, occupying a portion only of the top face 42 of the clamping bar 13 and serves to quickly turn the chips produced during the cutting operation away from the cutting edge on the cutter blades. The top and bottom faces 42, 45 of the clamping bar 13 are parallel, with the top face 42 being considerably wider than the bottom face 45, and joining the top and bottom faces at right angles thereto is a flat side face 51. Opposite side face 53 is arcuately shaped and converges toward the flat face 51 continuously from near the top face 42 to the bottom face 45. The flat side face 51 is arranged to bear against one face of a cutter blade with full surface engagement while the arcuate side face 53 is arranged to bear against the leading side wall 23 of a slot 9 with substantially line engagement. The point O in Fig. 3 is the center of curvature of the arcuate side face 53 and it lies in the plane of the top face 42 extended at a distance therefrom equal to R, the radius of curvature of the arcuate side face 53. The dotted line C through the center of the counterbored holes 32, 34 in each clamping bar 13 represents the line of travel of the clamping bar as it moves inwardly in a slot 9 for locking a cutter blade since the line C is the longitudinal axis of each cap screw 31 engaging the clamping bar 13 for guiding and controlling the inward movement thereof. The line L which is substantially parallel to the line C represents the leading side of a slot which coacts with the arcuate side face 53 of the clamping bar 13.

The blades 11 in each of the slots 9 are conventional blades for this type of cutter head and extend the length thereof with their ends projecting beyond the cylindrical body portion 7. Each of the blades 11 has a beveled surface 57 which makes an oblique angle with its leading face 59 to form a cutting edge 61 in well-known manner. The leading face 59 of each blade engages the straight side face 51 of a clamping bar 13 while the trailing face 63 of each blade engages a trailing side wall 25 of the slot in which it is disposed and the bottom face 65 of the cutter blades rests on the outer edge 43 of the flat head adjusting screws 35, as described.

In setting up the cutter blades and locking means on the rotary cutter head, a cutter blade 11 is first placed in each slot 9 so that the bottom face 65 thereof rests at 44 on the outer edges 43 of each pair of adjusting screws 35 which have already been screwed in place. A clamping bar 13 is then placed in position between each of the cutter blades 11 and leading side wall 23 of each of the slots 9 with the side faces 51, 53 properly disposed and with the counerbored holes 32, 34 aligned with the tapped apertures 29 projecting into the body portion 7 from the bottom surface 27 of each of the slots 9. With the clamping bars 13 properly aligned in each of the slots 9, the cap screws 31 are inserted into the counterbored holes 32, 34 in each of the clamping bars 13 and rotated a few turns to loosely engage the threaded apertures 29. The adjusting screws 35 are rotated to raise each of the cutter blades 11 to present their cutting edges 61 in precisely the same plane. The pair of adjusting screws 35 for each blade are disposed on the same side of the longitudinal center thereof so that each must be rotated substantially the same amount to keep the cutter blade parallel to the longitudinal axis of the cutter head. With each of the cutter blades positioned in the proper plane, the cap screws 31 within each slot are tightened to draw the clamping bar 13 inwardly toward the bottom of the slot. In its movement inwardly of the slot, the arcuate side face 53 of the clamping bar 13 engages the leading side wall 23 of the slot with substantially line contact so that premature locking or freezing of the clamping bar does not occur and the flat side face 51 engages the leading side 59 of the cutter blade with full surface engagement so that the cutter blade is securely wedged in its finally adjusted position. The clamping bar, it will be noted, is adapted to be placed into the slot directly from above similarly as is the cutter blade and both can be easily lifted radially outwardly. The diverging slot also has the advantage of being easiy machined as compared with the converging slots heretofore used. Despite divergence, however, centrifugal force cannot cause the blades to come loose.

After the cutter head has been in use and it is desired to remove the cutter blade, the screws 31 can be unloosed to release the clamp on the blade. If there is any freezing or locking, a slight turn of the jack screws 35 will quickly break it, it being noted that the axis of the screws 35 converges inwardly with the surfaces 23 and 25. It will be seen that the jack screws 35 act to preserve the depth setting of the blade so that upon reinsertion of the blade it automatically is set at the same radial position and that they also make it readily possible to micro-adjust the blade settings.

It will thus be seen that there has been provided by this invention a rotary cutter head in which the various objects hereinabove set forth, together with many thoroughly practical advantages, are successfully achieved. While the preferred embodiment of the invention has been shown and described, it is to be understood that various modifications and changes may be made without departing from the spirit thereof or the scope of the appended claims.

What is claimed is:

1. In a rotary cutter head, a body portion, longitudinal slots therein formed inwardly from the periphery thereof having inwardly converging side walls, cutter blades seated in said slots, clamping bars received in said slots arranged for unrestricted movement outwardly thereof, said bars having top and bottom faces with the top faces wider than the bottom faces, said bars having side faces which converge inwardly from near the top faces thereof in contacting relation with said body portion and the blades, one of said side faces being flat and the other convex, and inwardly acting means for actuating the bars to wedge them between said body portion and said blades.

2. In a rotary cutter head, a body portion, longitudinal slots formed in the periphery thereof having inwardly converging side walls, cutter blades seated in said slots, clamping bars received in said slots arranged for unrestricted movement outwardly thereof, said bars having top and bottom faces with the top faces wider than the bottom faces, said bars having side faces which converge inwardly from near the top faces thereof and which are disposed in contacting relation with said body portion and the blades, one of said side faces being flat and the other convex, inwardly acting means for actuating the bars to wedge them between said body portion and said blades, and outwardly acting means to release the blades from their wedged position.

3. In a rotary cutter head, a body portion, longitudinal slots formed in the periphery thereof having inwardly converging side walls, cutter blades seated in said slots, clamping bars received in said slots occupying a major portion and arranged for unrestricted movement outwardly thereof, said bars having top and bottom faces, the top faces being wider than the bottom faces, said bars also having opposite side faces one of which is flat and the other arcuately shaped, said side faces converging inwardly from near the top faces and being disposed in contacting relation with said body portion and the blades, inwardly acting means for actuating the bars to wedge them between said body portion and said blades, means for adjustably fastening said inwardly acting means to said body portion, outwardly acting means to release the blades from their wedged position, and means for adjustably fastening said outwardly acting means to said body portion.

4. In a rotary cutter head, a body portion, longitudinal slots formed inwardly from the periphery thereof having bottom surfaces and inwardly converging side walls, said walls of each slot making an obtuse angle and a right angle with each bottom surface, cutter blades seated in said slots each with one side disposed against one of said walls of each slot, clamping bars received in said slots occupying a major portion and arranged for unrestricted movement outwardly thereof, said bars having top and bottom faces, the top faces being wider than the bottom faces, said bars also having opposite side faces one of which is flat and the other arcuately shaped, said side faces converging inwardly from near the top faces and being disposed in contacting relation with the opposite side of each blade from said one side thereof and the other of said walls of each slot, inwardly acting means for actuating the bars to wedge them between said other walls and said blades, means for adjustably fastening said inwardly acting means to said body portion, outwardly acting means adjustably fastened to said body portion to release the blades from their wedged position, and means for adjustably fastening said outwardly acting means to said body portion.

5. In a rotary cutter head, a body portion, longitudinal slots formed inwardly from the periphery thereof, having bottom surfaces and inwardly converging side walls, the leading and trailing walls of each slot with respect to the direction of rotation of the cutter head making an obtuse and right angle respectively with the bottom surface thereof, cutter blades seated in said slots each with one side disposed against the trailing side wall of each slot, clamping bars received in said slots occupying a major portion and arranged for unrestricted movement outwardly thereof, said bars having top and bottom faces, the top faces being wider than the bottom faces, said bars also having opposite side faces converging inwardly from near the top faces thereof, one of each of which is flat and the other arcuately shaped in contacting relation respectively with the leading side wall of each slot through substantially line engagement and the opposite side of said blade from said one side through full surface engagement, inwardly acting means for actuating the bars to wedge them between the leading side walls and said blades, means for adjustably fastening said inwardly acting means to said body portion, outwardly acting means adjustably fastened to said body portion to release the blades from their wedged position, and means for adjustably fastening said outwardly acting means to said body portion.

6. The structure according to claim 5 wherein said outwardly acting means and means for adjustably fastening said outwardly acting means to said body portion comprises tapped apertures protruding inwardly into said body portion adjacent said slots, machine screw means threadably engaging said apertures having means contacting the bottom surfaces of said blades and being rotatable to release said blades from their wedged positions.

7. The structure according to claim 6 wherein said inwardly acting means and said means for adjustably fastening said inwardly acting means to said body portion comprises transverse bores extending through said bars, tapped apertures in said body portion protruding inwardly from said bottom surfaces, fastener means carried in said bores threadably engaging said apertures and restrained from movement in said bars inwardly a predetermined distance, said fastener means being rotatable to actuate the bars to wedge them between the leading sidewalls and said blades.

8. In a rotary cutter head, a body portion, longitudinal slots formed inwardly from the periphery thereof having bottom surfaces and inwardly converging side walls, the leading and trailing walls of each slot with respect to the direction of rotation of the cutter head making an obtuse and right angle respectively with the bottom surface thereof, cutter blades seated in said slots each with one face disposed against the trailing side wall of each slot, clamping bars received in said slots occupying a major portion and arranged for unrestricted movement outwardly thereof, said bars having top and bottom faces, the top faces being wider than the bottom faces, said bars also having opposite side faces converging inwardly from near the top faces thereof, one of each of which is flat and the other arcuately shaped, said each arcuate face having its center of curvature lying in the plane of the respective top face on each bar, a chip break groove formed in each of said top faces adjacent the respective flat side face on each bar and extending longitudinally over the length of said each bar, said arcuate side faces being in contacting relation with the leading side walls of said slots through substantially line engagement, said flat side faces being in contacting relation with the opposite blade faces of the blades from each of said one blade face through full surface engagement, transverse concentric counter bores extending through said bars providing annular shoulders therein, tapped apertures in said body portion protruding inwardly from said bottom surfaces, fastener means carried in said bores threadably engaging said apertures having heads bearing against said shoulders so as to be restrained from movement in said bars inwardly, said fastener means being rotatable to actuate the bars to wedge them between the leading side walls and said blades, tapped apertures protruding inwardly into said body portion adjacent said slots and being equally spaced on each side of the centers of said slots, machine screw means threadably engaging said last-mentioned apertures having heads projecting into said slots and contacting the bottom surfaces of said blades and being rotatable to release said blades from their wedged positions.

9. In a cutter head, a body, a radial cutter blade slot in the body having a side surface defining the plane of the blade, a threaded aperture opening into the bottom of said slot and located at an acute angle to the plane of said surface, a micro adjustment screw threaded in said aperture, and a cutter blade with a flat bottom in said slot supported by said surface and having a central section of the bottom thereof in line engagement with an edge of an end of said screw.

References Cited in the file of this patent
UNITED STATES PATENTS

| | | |
|---|---|---|
| 632,618 | Anderson | Sept. 5, 1899 |
| 1,010,645 | Lane | Dec. 5, 1911 |
| 1,346,215 | Kraber | July 13, 1920 |
| 1,934,465 | Hillner | Nov. 7, 1933 |
| 2,257,169 | Hopps | Sept. 30, 1941 |
| 2,660,242 | Lane | Nov. 24, 1953 |

FOREIGN PATENTS

| | | |
|---|---|---|
| 823,042 | Germany | Nov. 29, 1951 |
| 845,259 | Germany | July 31, 1952 |
| 701,003 | Great Britain | Dec. 16, 1953 |